US011946630B2

(12) United States Patent
Lin

(10) Patent No.: US 11,946,630 B2
(45) Date of Patent: Apr. 2, 2024

(54) LED LAMP HEAT DISSIPATION STRUCTURE WITH OUTWARD CORRUGATIONS AND REFLECTOR FUNCTION

(71) Applicant: Chien-Ting Lin, Santa Fe Springs, CA (US)

(72) Inventor: Chien-Ting Lin, Santa Fe Springs, CA (US)

( * ) Notice: Subject to any disclaimer, the term of this patent is extended or adjusted under 35 U.S.C. 154(b) by 0 days.

(21) Appl. No.: 17/216,779

(22) Filed: Mar. 30, 2021

(65) Prior Publication Data

US 2022/0316693 A1 Oct. 6, 2022

(51) Int. Cl.
*F21V 29/77* (2015.01)
*F21Y 115/10* (2016.01)

(52) U.S. Cl.
CPC ......... *F21V 29/773* (2015.01); *F21Y 2115/10* (2016.08)

(58) Field of Classification Search
CPC ..... F21V 29/773; F21V 29/745; F21V 29/713
See application file for complete search history.

(56) References Cited

U.S. PATENT DOCUMENTS 8,907,550 B2 * 12/2014 Zaderej ................... F21V 29/89 313/46
9,163,820 B2 * 10/2015 Bakk ....................... F21V 29/83
2014/0175966 A1 * 6/2014 Tan ......................... F21K 9/233 313/46

* cited by examiner

*Primary Examiner* — Karabi Guharay
(74) *Attorney, Agent, or Firm* — Lin & Associates Intellectual Property, Inc.

(57) ABSTRACT

Provided is an LED lamp heat dissipation structure, including: a metal plate and an LED lamp substrate. The metal plate has a first predetermined shape portion, wherein a center of the metal plate is defined to have a second predetermined shape portion, an outer edge of the metal plate is formed to be a tapered portion with outward corrugations and with a center at the second predetermined shape portion, the tapered portion has a predetermined inclination angle with respect to the second predetermined shape portion, two surfaces of the second predetermined are defined as an inner surface and an outer surface, respectively, and the tapered portion surrounds the inner surface to define an inner space. The LED lamp substrate is closely attached to the inner surface. The heat generated from the LED lamp substrate can be efficiently transferred to an ambient air through the LED lamp heat dissipation structure.

9 Claims, 18 Drawing Sheets

LED LAMP HEAT DISSIPATION STRUCTURE WITH OUTWARD CORRUGATIONS AND REFLECTOR FUNCTION

BACKGROUND OF THE INVENTION

1. Field of the Invention

The present invention relates to an LED lamp heat dissipation structure, and more particularly to an LED lamp heat dissipation structure with outward corrugations and a reflector function.

2. The Prior Art

The existing LED lamp heat dissipation structures are generally formed by mold casting a metal with excellent heat conductivity, such as aluminum die-casting radiator. The casting method has the advantages of integrally formed structure and good heat conduction effect, but has the disadvantages of high production cost and too many subsequent machining processes. The thickness of the radiator will be limited by the production method. As such, it cannot be manufactured to be too thin, and the actual heat dissipation effect will also be affected.

Another existing LED lamp heat dissipation structures are formed by stamping a thin metal sheet with excellent heat conductivity. The stamping method has the advantage that the thickness of the thin metal sheet can be adjusted to the required thickness according to the needs. The metal sheet can be punched into the required shape through a series of stages during the stamping process, which can increase the contact area between the metal plate and air, thereby increasing the heat dissipation effect. The disadvantage is that such products are made up of various stamping parts, which will affect the heat conduction effect.

Most of the existing reflectors only contain a tapered portion, and generally need other heat dissipation structures to help solving the heat dissipation problem.

SUMMARY OF THE INVENTION

In order to overcome the problems of poor heat dissipation and low heat conduction efficiency for the existing LED lamp heat dissipation structures, the present invention provides an LED lamp heat dissipation structure with outward corrugations and a reflector function, comprising: a metal plate having a first predetermined shape portion, wherein a center of the metal plate is defined to have a second predetermined shape portion, an outer edge of the metal plate is formed to be a tapered portion with a plurality of outward corrugations and with a center at the second predetermined shape portion, and the tapered portion has a predetermined inclination angle with respect to the second predetermined shape portion. The tapered portion can have a reflection effect, and the outward corrugations can increase the heat dissipation area, thereby capable of achieving lower energy consumption and also solving the problems of poor heat dissipation and low heat conduction efficiency for the existing LED lamp heat dissipation structures.

The technical solution adopted by the present invention to solve the technical problem is to provide an LED lamp heat dissipation structure with outward corrugations and a reflector function, comprising: a metal plate and an LED lamp substrate. The metal plate has a first predetermined shape portion, wherein a center of the metal plate is defined to have a second predetermined shape portion, an outer edge of the metal plate is formed to be a tapered portion with a plurality of outward corrugations and with a center at the second predetermined shape portion, the tapered portion has a predetermined inclination angle with respect to the second predetermined shape portion, two surfaces of the second predetermined shape portion are defined as an inner surface and an outer surface, respectively, and the tapered portion surrounds the inner surface to define an inner space. The LED lamp substrate is closely attached to the inner surface. When the LED lamp substrate is empowered with electricity, a heat and a light are generated, wherein most of the heat is conducted to the second predetermined shape portion through the inner surface, and then conducted to an ambient air through the outer surface, the tapered portion, and the outward corrugations, a part of the light directly irradiates outward, and the other part of the light is reflected outward through the tapered portion.

Preferably, the second predetermined shape portion is formed to have a convex platform protruded toward the inner space, the outer surface is formed to have a corresponding recess with a flat bottom, the tapered portion are uniformly cut at predetermined places to form a plurality of U-shaped pieces, each of the plurality of U-shaped pieces is located between two adjacent outward corrugations, a bottom of each of the plurality of U-shaped pieces faces toward the second predetermined shape portion, each of the plurality of U-shaped pieces is respectively bent toward the inner space to be connected with the convex platform, and a plurality of heat dissipation holes are respectively formed in original positions of the plurality of U-shaped pieces before being bent.

Preferably, the LED lamp heat dissipation structure further comprises a lamp holder, wherein the lamp holder has a coupling opening and a coupling portion, and the coupling opening is connected with the tapered portion in a direction toward the outer surface.

Preferably, the tapered portion is provided with a light guide cover at an opening edge thereof so as to make the light more uniform.

Preferably, the LED lamp heat dissipation structure further comprises an outer shell, wherein the outer shell sleeves the metal plate from outside in a direction toward the outer surface.

The beneficial effect of the present invention is that the present invention can have a reflector effect by the tapered portion, can increase the heat dissipation area by the outward corrugations, and thus can achieve lower energy consumption. The present invention can also solve the problems of poor heat dissipation and low heat conduction efficiency for the existing LED lamp heat dissipation structures.

BRIEF DESCRIPTION OF THE DRAWINGS

The following drawings form part of the present specification and are included here to further demonstrate some aspects of the present invention, which can be better understood by reference to one or more of these drawings, in combination with the detailed description of the embodiments presented herein.

DETAILED DESCRIPTION OF THE PREFERRED EMBODIMENT

In the following detailed description of the embodiments of the present invention, reference is made to the accompanying drawings, which are shown to illustrate the specific embodiments in which the present invention may be practiced. These embodiments are provided to enable those skilled in the art to practice the present invention. It is understood that other embodiments may be used and that changes can be made to the embodiments without departing from the scope of the present invention. The following description is therefore not to be considered as limiting the scope of the present invention.

Hereinafter, the embodiments of the present invention are described based on FIGS. 1 to 10. The description is not intended to limit the embodiments of the present invention, but is a kind of embodiment of the present invention.

Figure 1:
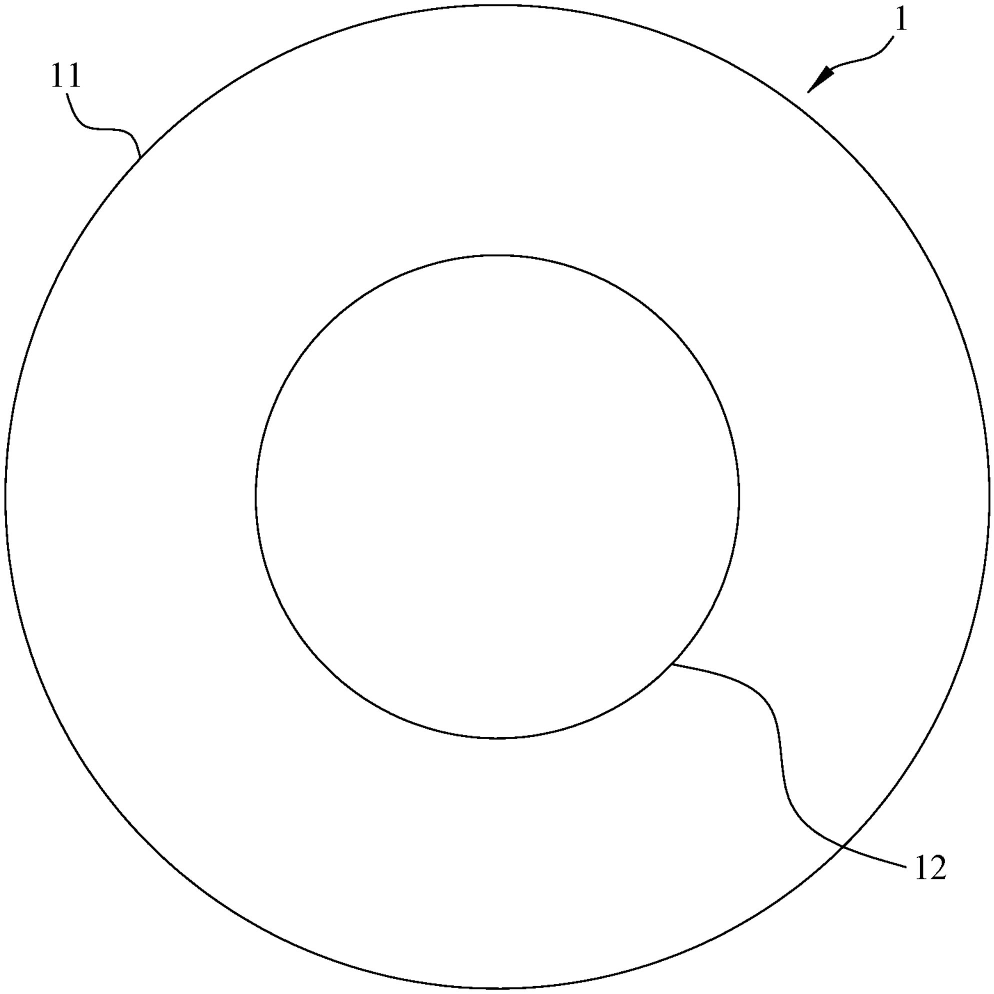
FIG. 1 is a schematic view of Embodiment 1 of the present invention before being formed to a specific LED lamp heat dissipation structure.
Figure 2A:
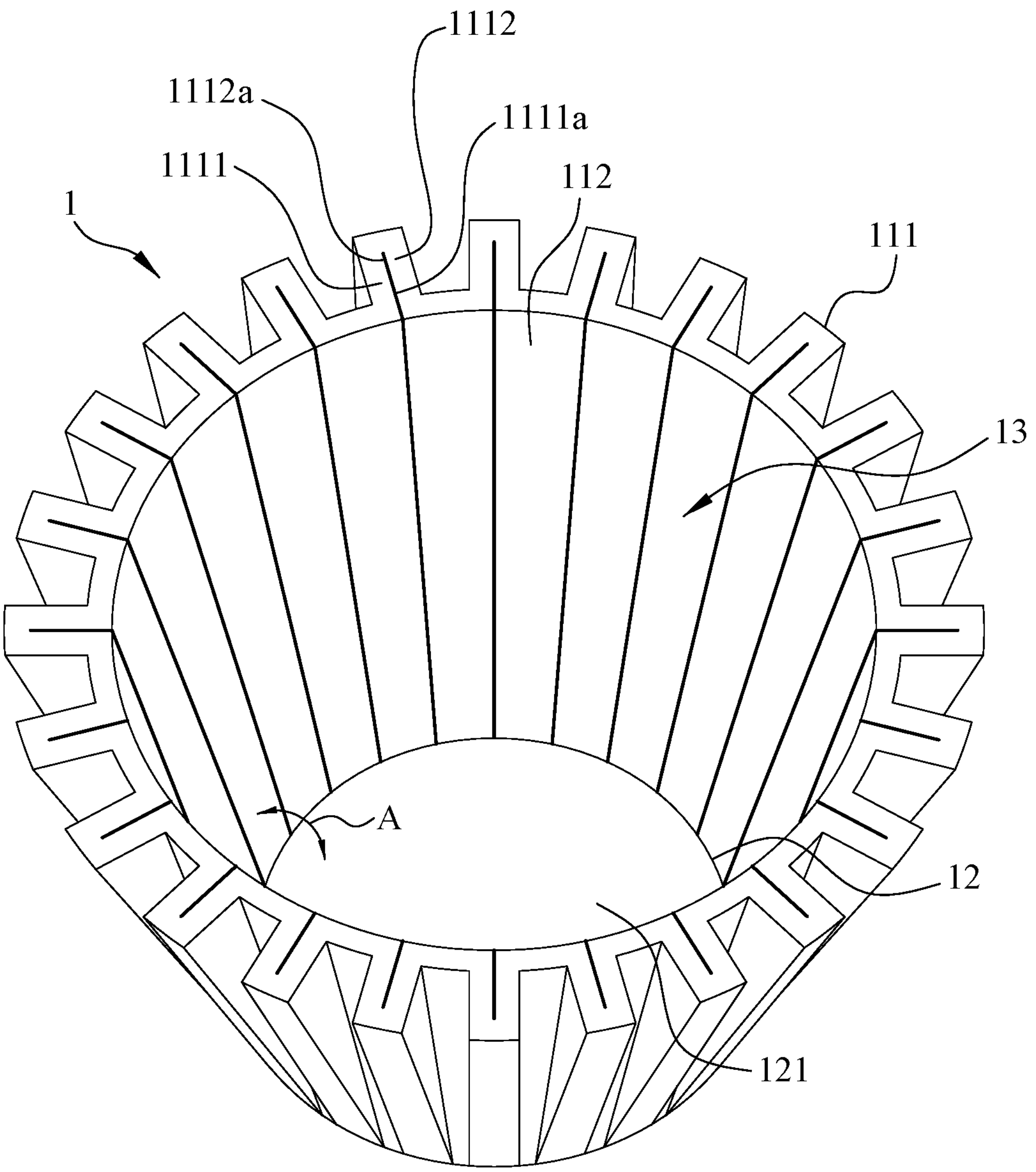
FIG. 2A is a schematic view of Embodiment 1 of the present invention.
Figure 2B:
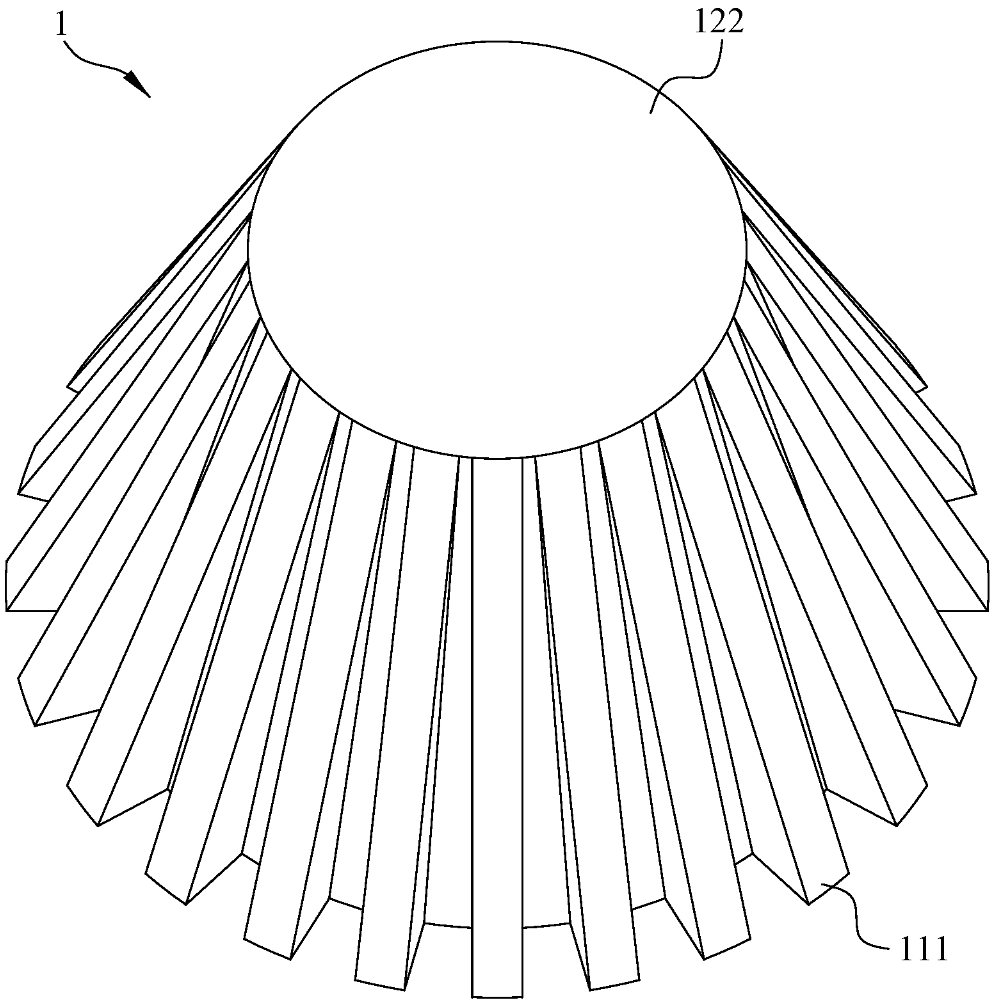
FIG. 2B is another schematic view of Embodiment 1 of the present invention.
Figure 3:
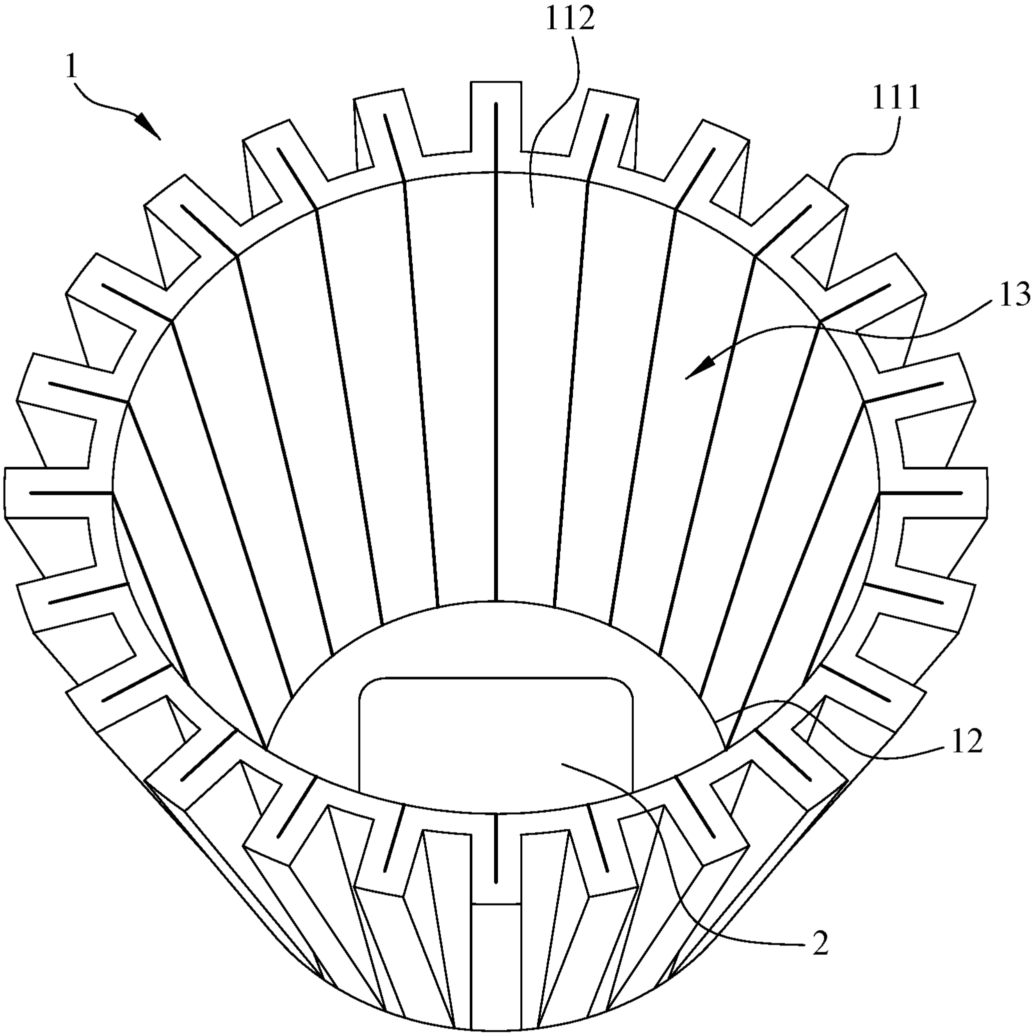
FIG. 3 is a schematic view of Embodiment 1 of the present invention with an LED lamp substrate disposed thereon.
Figure 4:
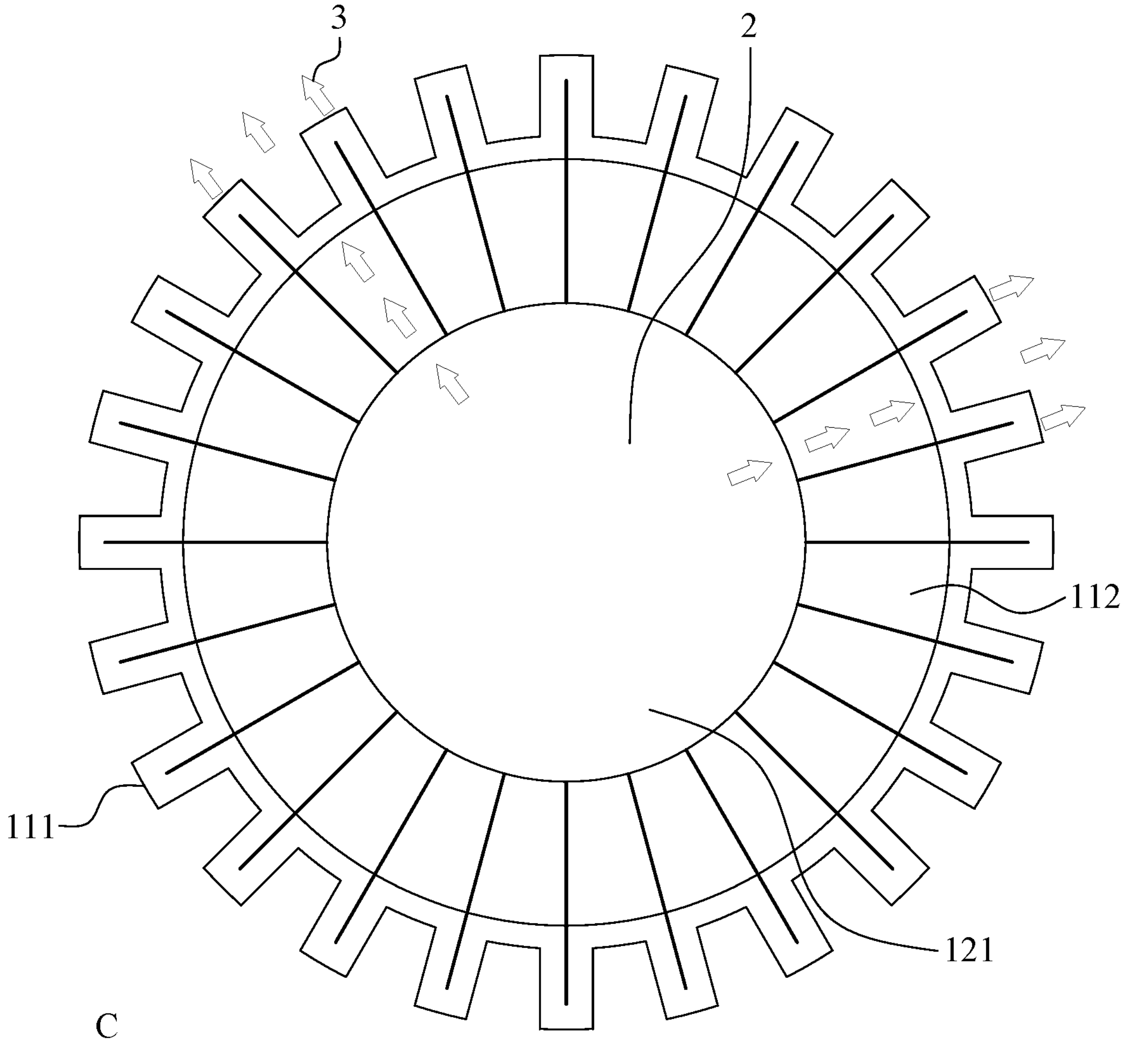
FIG. 4 is a schematic view of Embodiment 1 of the present invention showing a heat conduction direction.
Figure 5A:
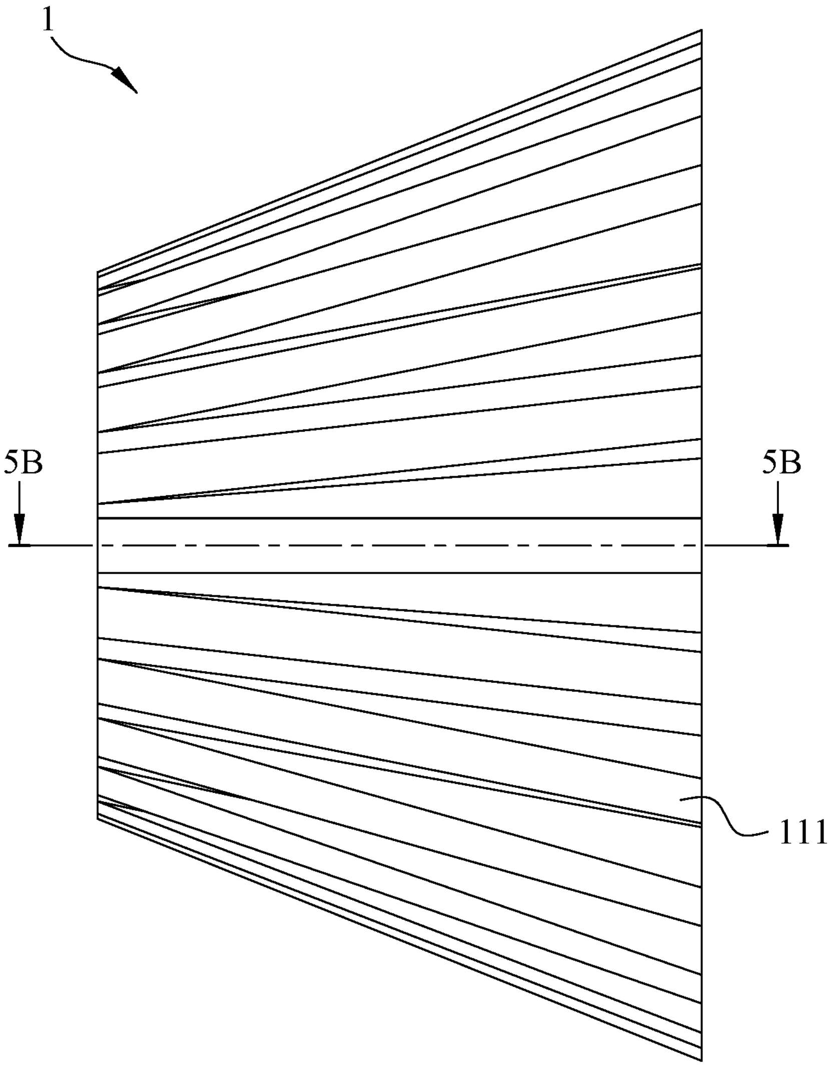
FIG. 5A is a schematic side view of Embodiment 1 of the present invention.
Figure 5B:
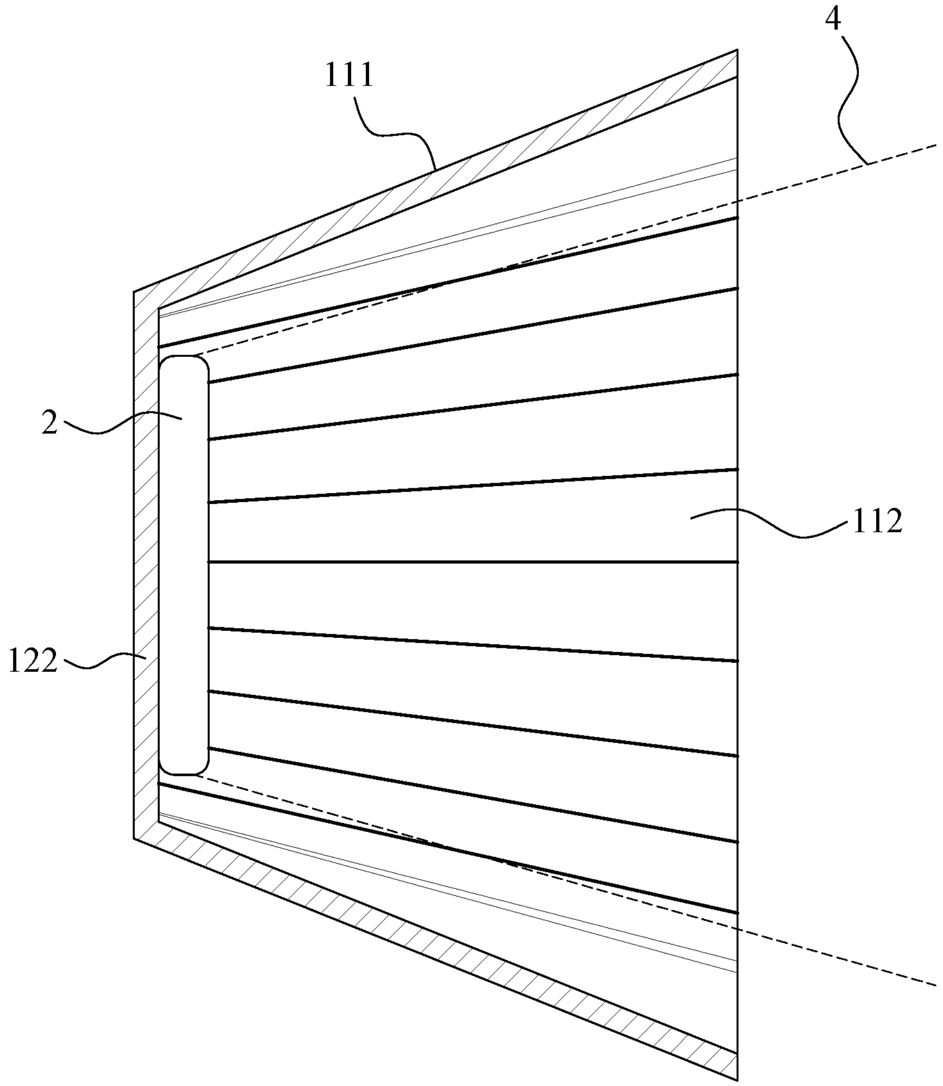
FIG. 5B is a schematic cross-sectional view taken along line 5B-5B in FIG. 5A.
Figure 5C:
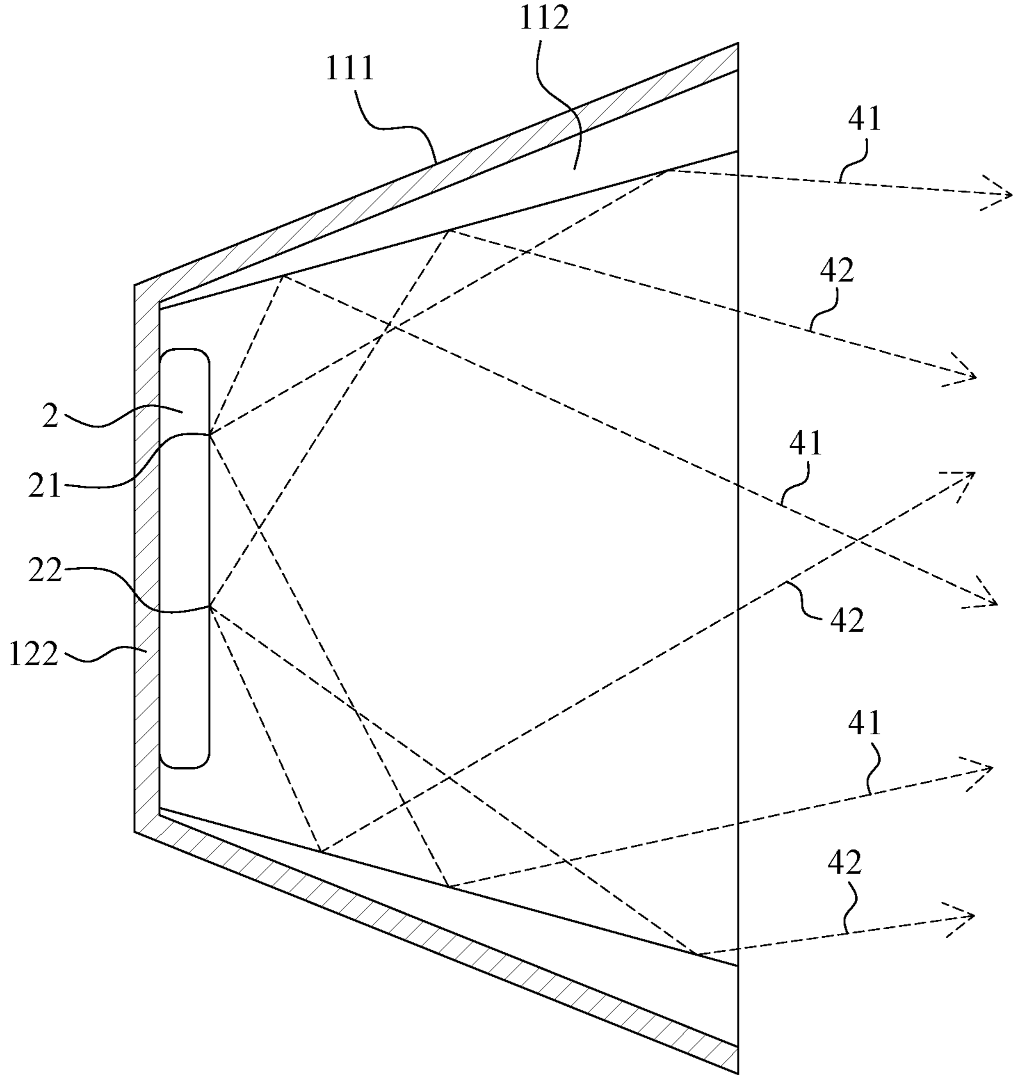
FIG. 5C is another schematic cross-sectional view taken along line 5B-5B in FIG. 5A.

As shown in FIGS. 1 to 5C, an LED lamp heat dissipation structure with outward corrugations and a reflector function according to Embodiment 1 of the present invention comprises: a metal plate 1 and an LED lamp substrate 2. The metal plate 1 has a first predetermined shape portion 11, and a center of the metal plate 1 is defined to have a second predetermined shape portion 12. As shown in FIGS. 2A and 2B, an outer edge of the metal plate 1 is formed to be a tapered portion 112 with a plurality of outward corrugations 111 and with a center at the second predetermined shape portion 12. The tapered portion 112 has a predetermined inclination angle A with respect to the second predetermined shape portion 12. Two surfaces of the second predetermined shape portion 12 are defined as an inner surface 121 and an outer surface 122, respectively, and the tapered portion 112 surrounds the inner surface 121 to define an inner space 13. As shown in FIG. 3, the LED lamp substrate 2 is closely attached to the inner surface 121. When the LED lamp substrate 2 is empowered with electricity, a heat 3 and a light 4 are generated; as shown in FIG. 4, most of the heat 3 is conducted to the second predetermined shape portion 12 through the inner surface 121, and then conducted to an ambient air C through the outer surface 122, the tapered portion 112, and the outward corrugations 111. Each of the outward corrugations 111 increases the contact area with the ambient air C, and thus can enhance the heat dissipation effect. As shown in FIGS. 5A to 5C, a part of the light 4 directly irradiates outward, and the other part of the light 4 is reflected outward through the tapered portion 112. According to Embodiment 1 of the present invention, a reflector and a radiator are integrally formed as a one-piece element and directly used in low and medium power LED lamps, thereby capable of greatly reducing the energy consumption, enhancing the heat dissipation effect, and reducing the production cost.

With reference to FIG. 2A or 3, it can be seen that each outward protrusion in the outward corrugations 111 has two inner walls butting against each other in the longitudinal direction of the tapered portion. It is worth pointing out that as shown in FIG. 2A, each outward protrusion is formed by two sections 1111 and 1112 of the metal plate 1 and two inner walls 1111*a* and 1112*a* of the two sections 1111 and 1112 face each other. The tapered portion 112 has an interior surface surrounding the inner space 13. Each of the two inner walls 111*a* and 1112*a* has an inner wall surface recessed from the inner space 13 above the inner surface 121 and connected with the interior surface of the tapered portion 112. The two inner wall surfaces face each other. As shown in FIG. 4, in Embodiment 1 of the present invention, the arrows show the conduction path of the heat 3. In fact, most of the heat 3 is evenly conducted from the second predetermined shape portion 12 to the ambient air C through the tapered portion 112 and the outward corrugations 111, but is not limited to the direction of the arrows in FIG. 4.

As shown in FIGS. 5A to 5C especially in FIG. 5B, in Embodiment 1 of the present invention, a part of the light 4 directly irradiates outward, and the other part of the light 4 irradiates the tapered portion 112 and then is reflected outward. To more clearly illustrate the reflection effect of the tapered portion 112, as shown in FIG. 5C, the light emitted from the LED lamp substrate 2 is simplified into a first luminous point 21 and a second luminous point 22, all of the light 4 directly irradiated outward from the first luminous point 21 and the second luminous point 22 are omitted, and only three reflected light beams 41 emitted from the first luminous point 21 and only three reflected light beam 42 emitted from the second luminous point 22 are retained. Among them, the three reflected light beams 41 emitted from the first luminous point 21 in respective different directions are reflected outward based on the respective incident angle on the tapered portion 112. Similarly, the three reflected light beams 42 emitted from the second luminous point 22 in respective different directions are reflected outward based on the respective incident angle on the tapered portion 112. In this embodiment, the light 4 can be irradiated to the outside by the reflection effect of the tapered portion 112, so that the light 4 can be concentrated in a certain area, so as to be able to increase the illuminance.

Figure 6A:
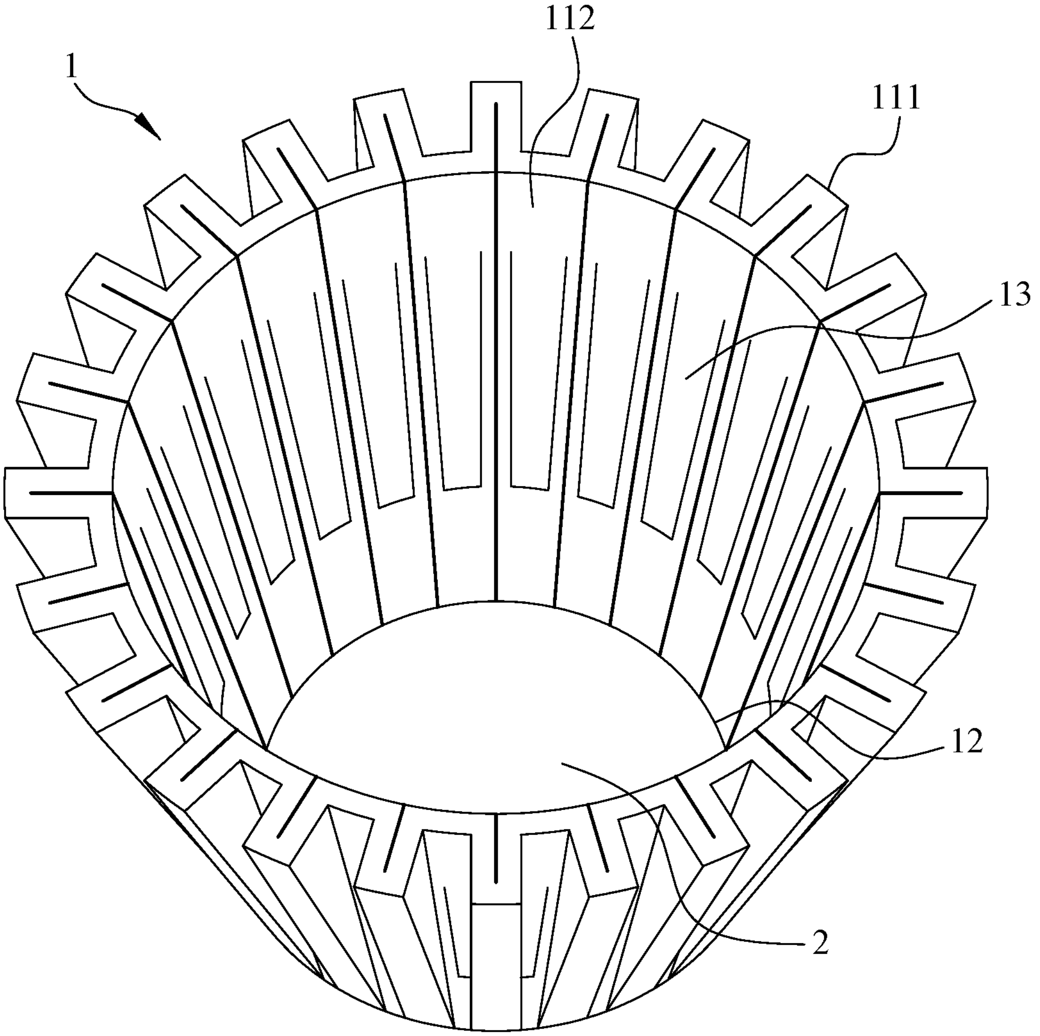
FIG. 6A is a schematic view of Embodiment 2 of the present invention.
Figure 6B:
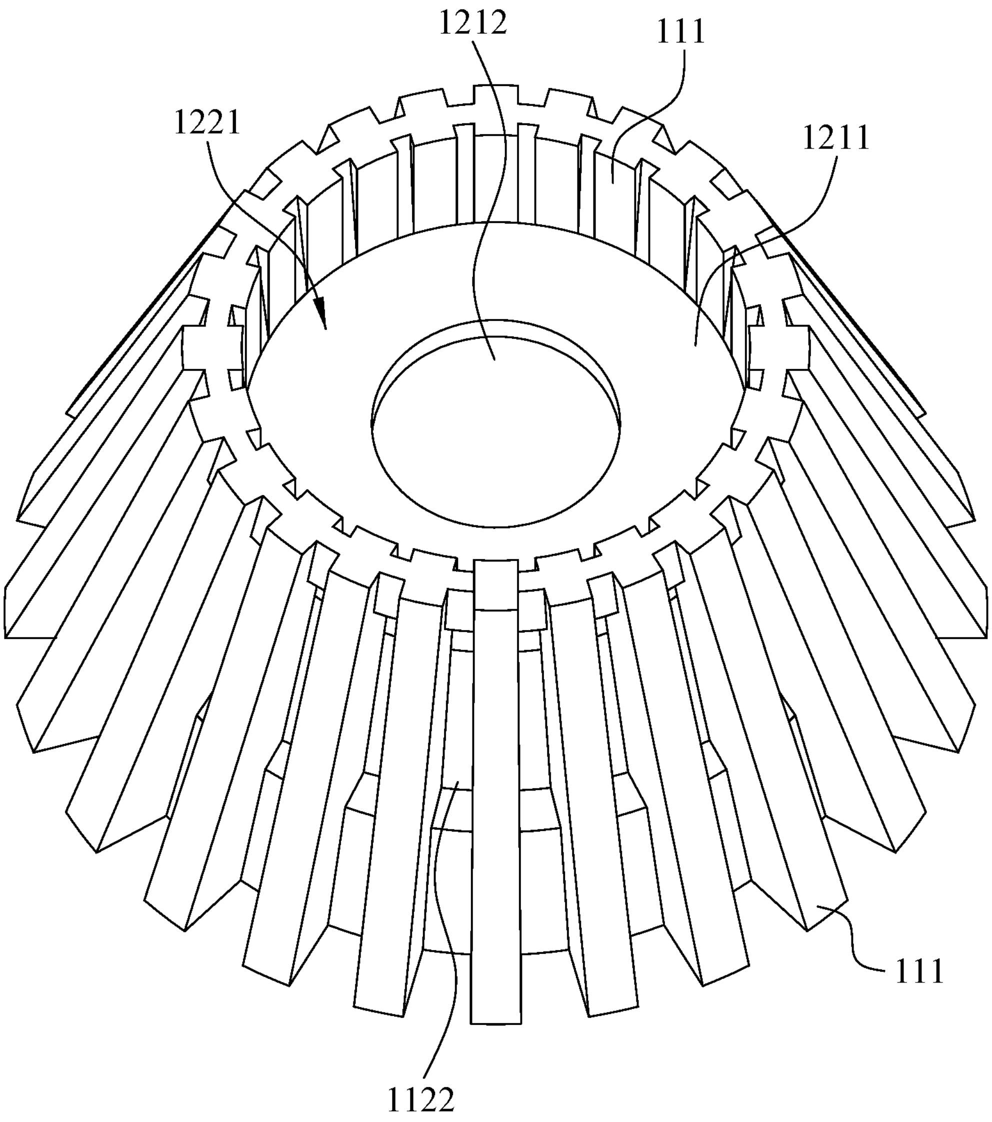
FIG. 6B is another schematic view of Embodiment 2 of the present invention.
Figure 6C:
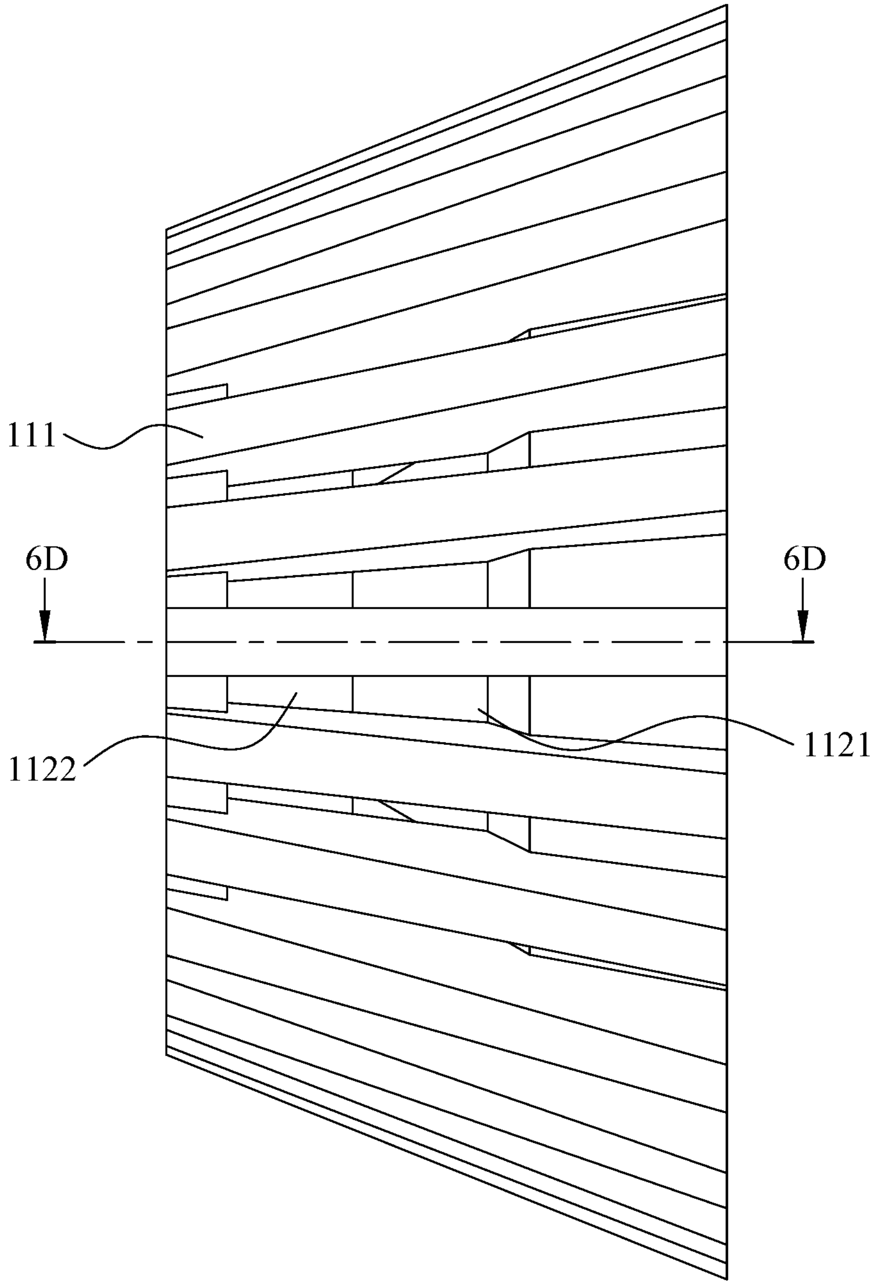
FIG. 6C is a schematic side view of Embodiment 2 and Embodiment 3 of the present invention.
Figure 6D:
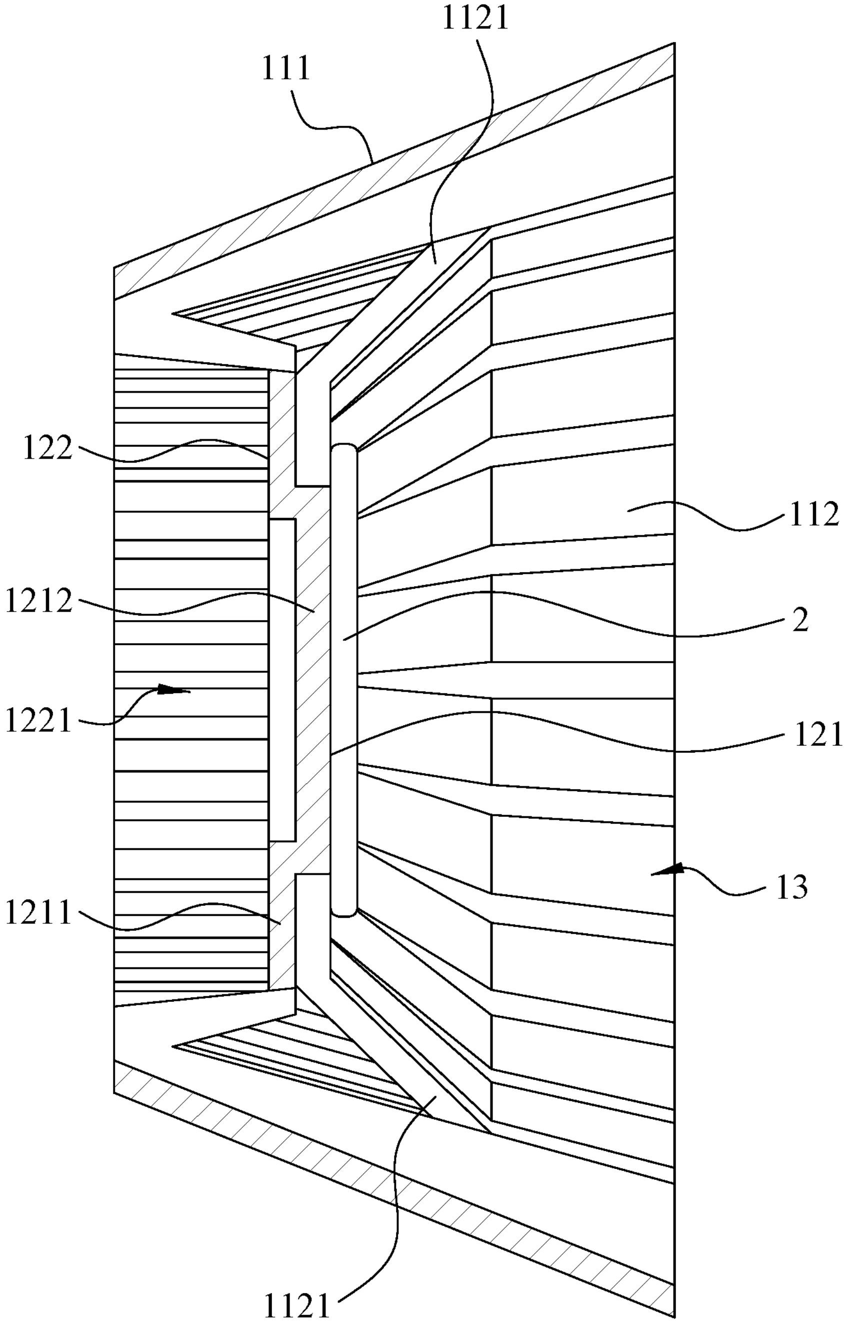
FIG. 6D is a schematic cross-sectional view taken along line 6D-6D in FIG. 6C.
Figure 7A:
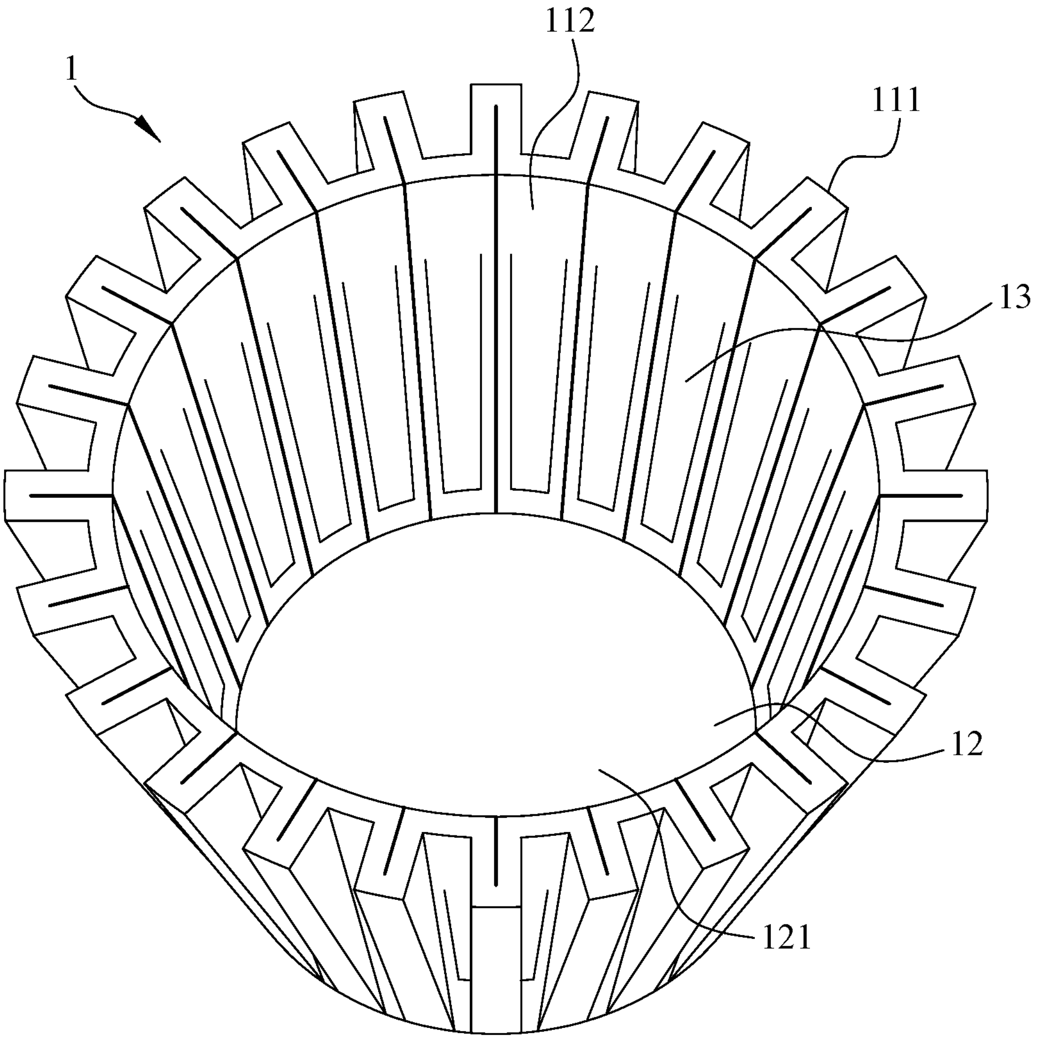
FIG. 7A is a schematic view of Embodiment 3 of the present invention.
Figure 7B:
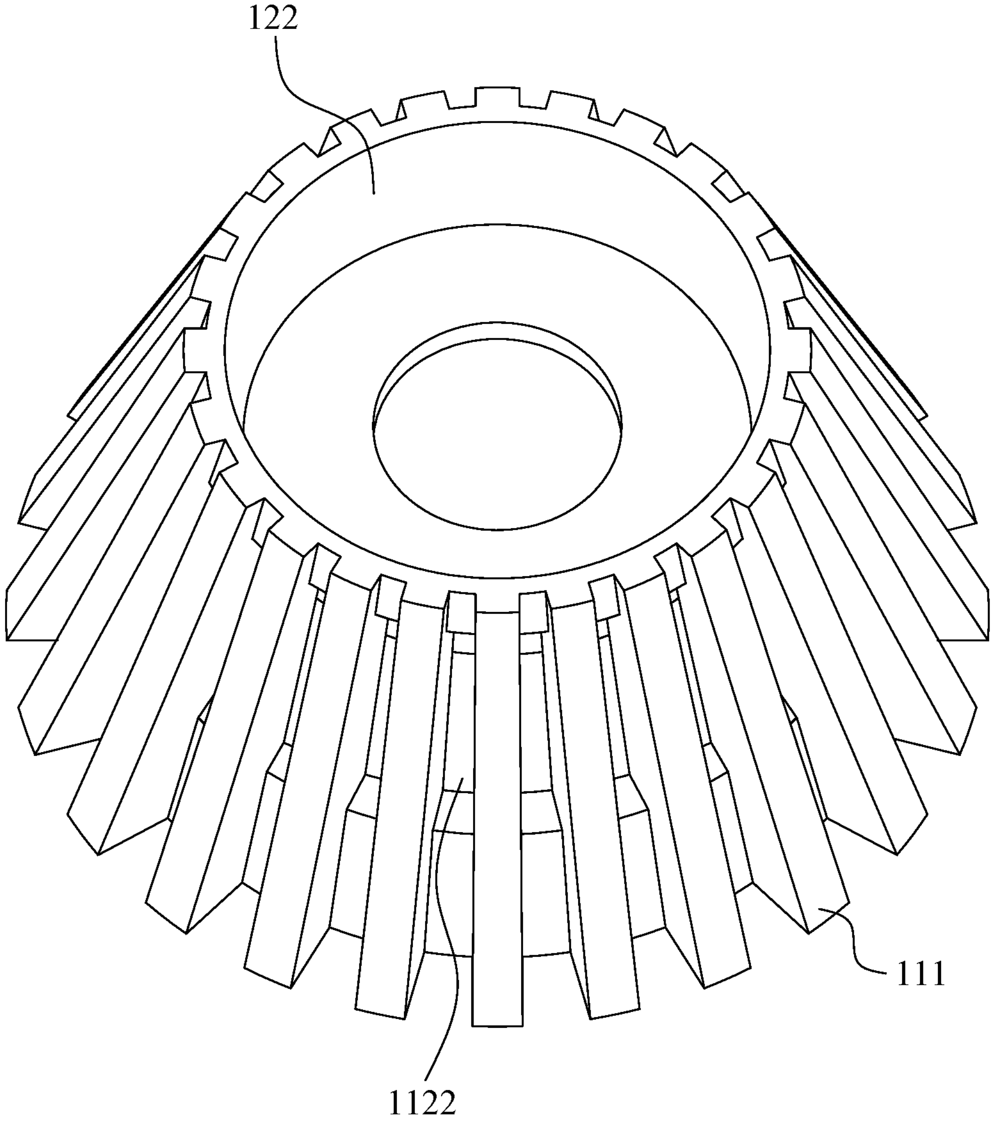
FIG. 7B is another schematic view of Embodiment 3 of the present invention.
Figure 8A:
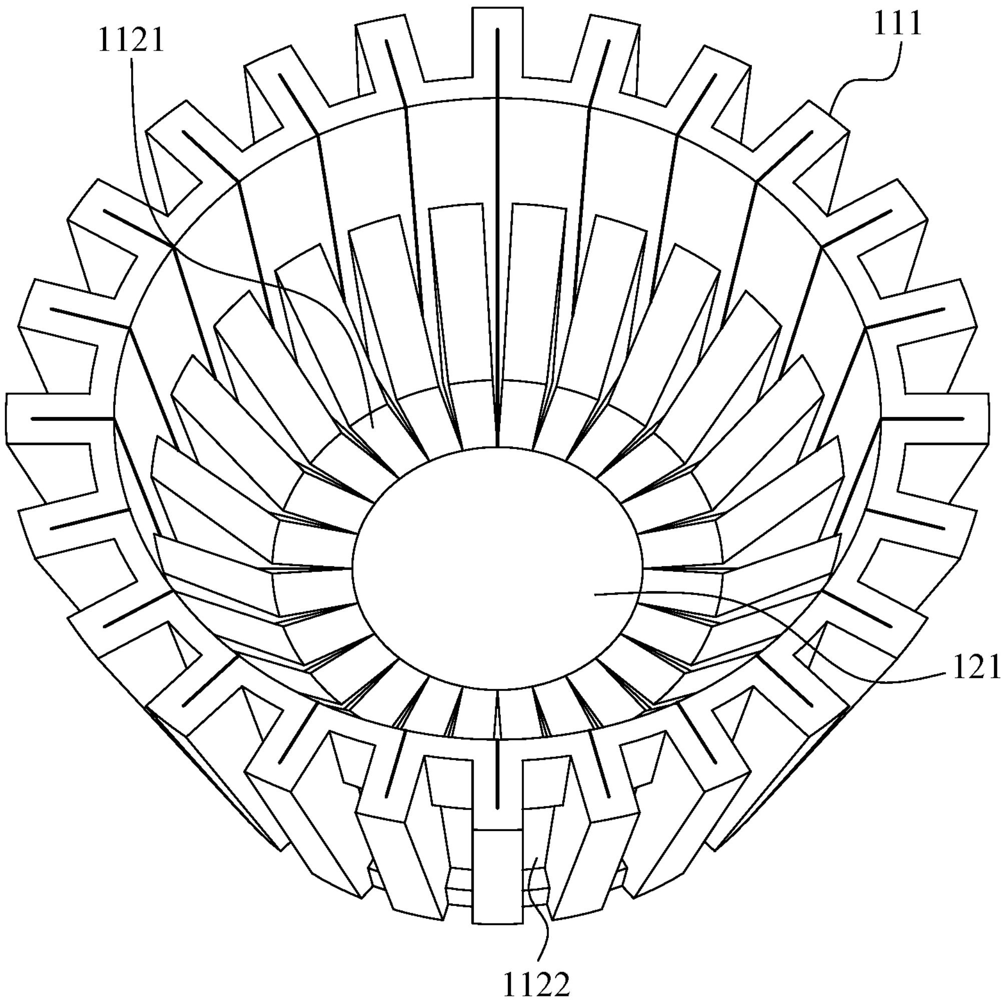
FIG. 8A is a schematic view of Embodiment 2 and Embodiment 3 of the present invention showing that the U-shaped pieces are bent toward the inner space and the LED lamp substrate is not provided thereon.
Figure 8B:
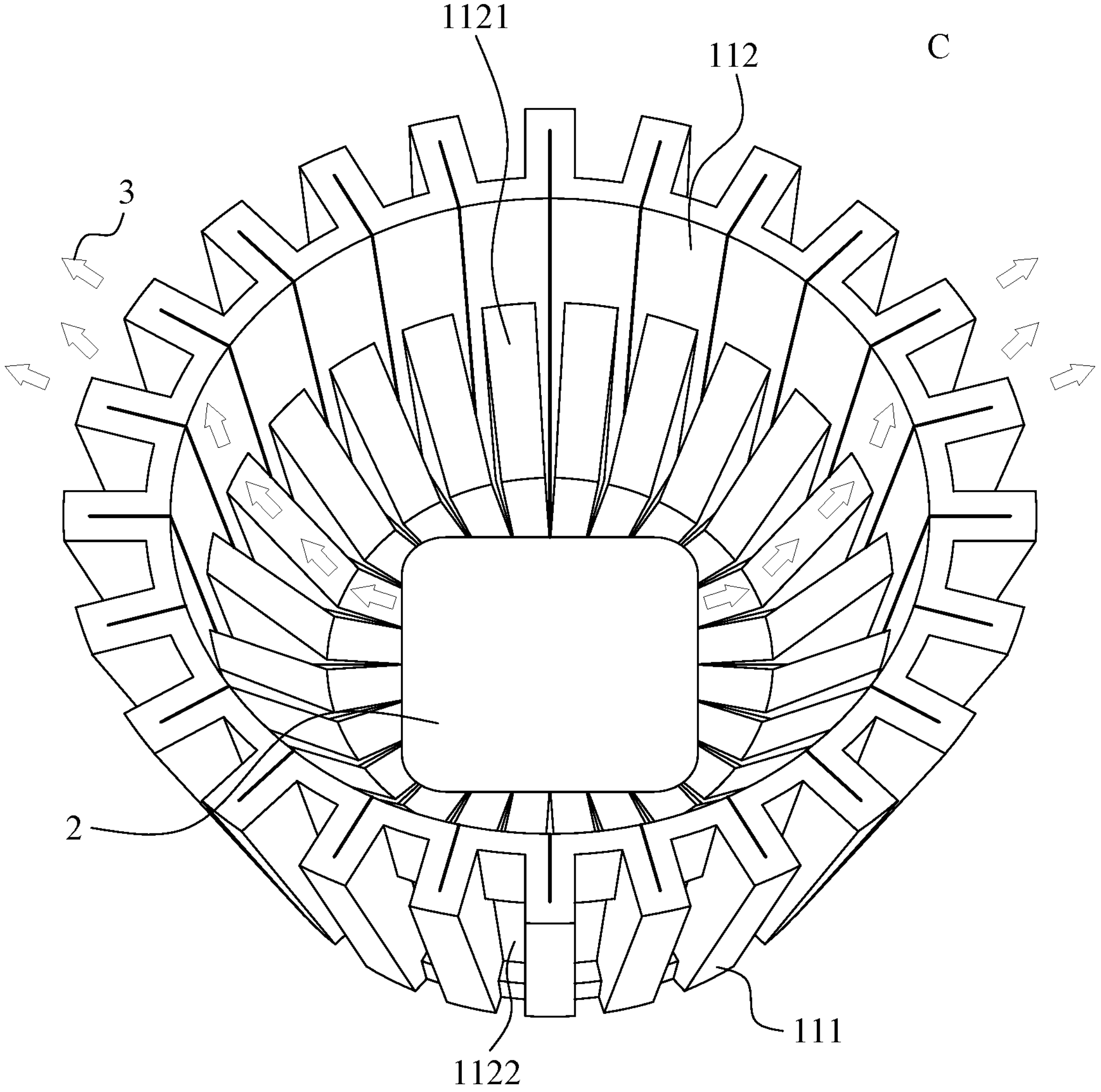
FIG. 8B is a schematic view of Embodiment 2 and Embodiment 3 of the present invention showing the conduction direction of heat generated from the LED lamp substrate.

FIGS. 6A to 8B show Embodiment 2 and Embodiment 3 of the present invention. As shown in FIGS. 6A to 7B, the second predetermined shape portion 12 is formed to have a convex platform 1211 protruded toward the inner space 13, and the outer surface 122 is formed to have a corresponding recess 1221 with a flat bottom. The tapered portion 112 are uniformly cut at predetermined places to form a plurality of U-shaped pieces 1121, each of the plurality of U-shaped pieces 1121 is located between two adjacent outward corrugations 111, and a bottom of each of the plurality of U-shaped pieces 1121 faces the second predetermined shape portion 12. As shown in FIGS. 6C and 6D, each of the plurality of U-shaped pieces 1121 is respectively bent toward the inner space 13 to be connected with the convex platform 1211, and a plurality of heat dissipation holes 1122 are respectively formed in original positions of the plurality of U-shaped pieces 1121 before being bent. In Embodiment 2 and Embodiment 3, as shown in FIGS. 8A and 8B, in addition to the original conduction path of the heat 3, a part of the heat 3 can be more quickly transferred to the tapered portion 112 through the U-shaped pieces 1121 and then transferred to the ambient air C. As described in Embodiment 1, the arrows in FIG. 8B show the conduction path of the heat 3. In fact, most of the heat 3 is evenly and outwardly conducted through the second predetermined shape portion 12, the tapered portion 112 and the outward corrugations 111 to the ambient air C, but is not limited to the direction of the arrow in FIG. 8B.

FIGS. 6A and 6B show Embodiment 2 of the present invention. The second predetermined shape portion 12 is folded toward the inner space 13 to form the recess 1221 and the convex platform 1211, and the recess 1221 is surrounded by a surface with the outward corrugations 111.

FIGS. 7A and 7B show Embodiment 3 of the present invention. The second predetermined shape portion 12 is stretched toward the inner space 13 to form the recess 1221 and the convex platform 1211, and the recess 1221 is surrounded by a stretched surface without corrugations.

Preferably, as shown in FIG. 6D, each of the plurality of U-shaped pieces 1121 is respectively bent toward the inner space 13 to be connected to the convex platform 1211. In order to prevent the U-shaped pieces 1121 from being bent and concentrated to a center of the convex platform 1211, a small convex platform 1212 can be provided in the center of the convex platform 1211 to compensate for a gap therebetween, so that the LED lamp substrate 2 is in full contact with the convex platform 1211 and the U-shaped pieces 1121, thereby increasing the heat conduction effect.

Preferably, the U-shaped pieces 1121 of Embodiment 2 and Embodiment 3 can be respectively bent toward the inner space 13 to an edge of the LED lamp substrate 2 for conducting the heat 3.

Figure 9:
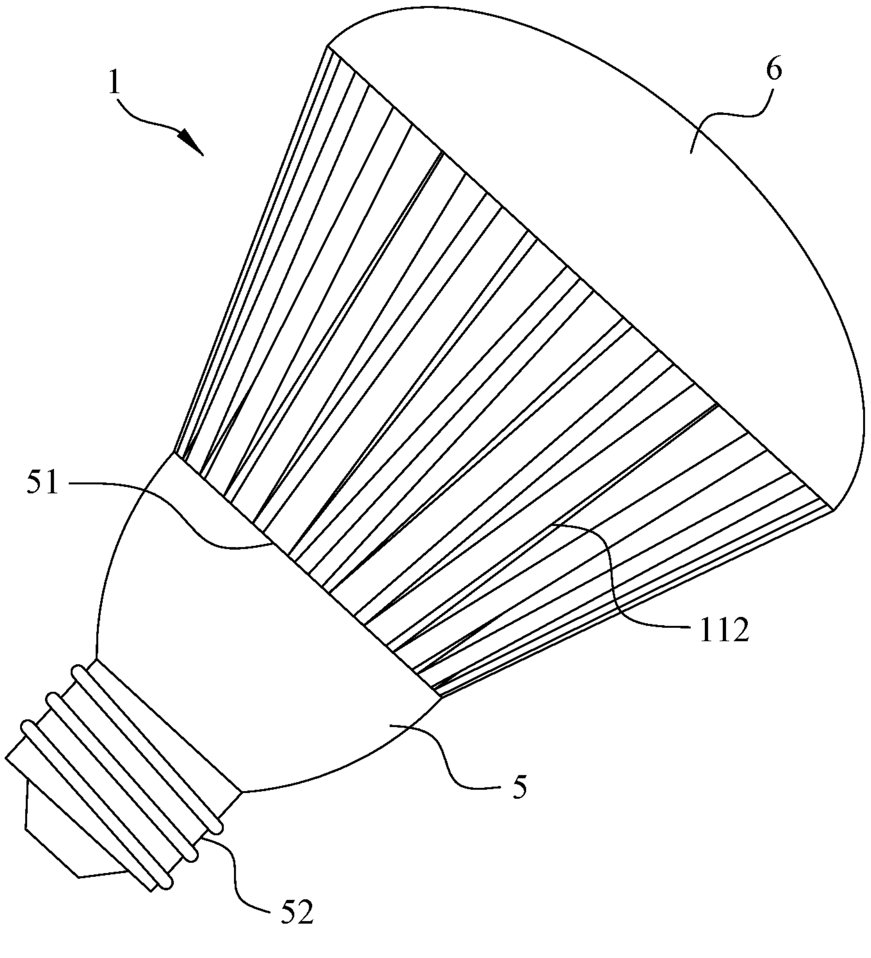
FIG. 9 is a schematic view of an LED lamp of Embodiment 4 of the present invention.

As shown in FIG. 9, which is Embodiment 4 of the present invention, the LED lamp heat dissipation structure further comprises a lamp holder 5 having a coupling opening 51 and a coupling portion 52, and the coupling opening 51 is connected with the tapered portion 112 in a direction toward the outer surface 122.

Preferably, as shown in FIG. 9, the tapered portion 112 is provided with a light guide cover 6 at an opening edge thereof so as to make the light more uniform.

Figure 10:
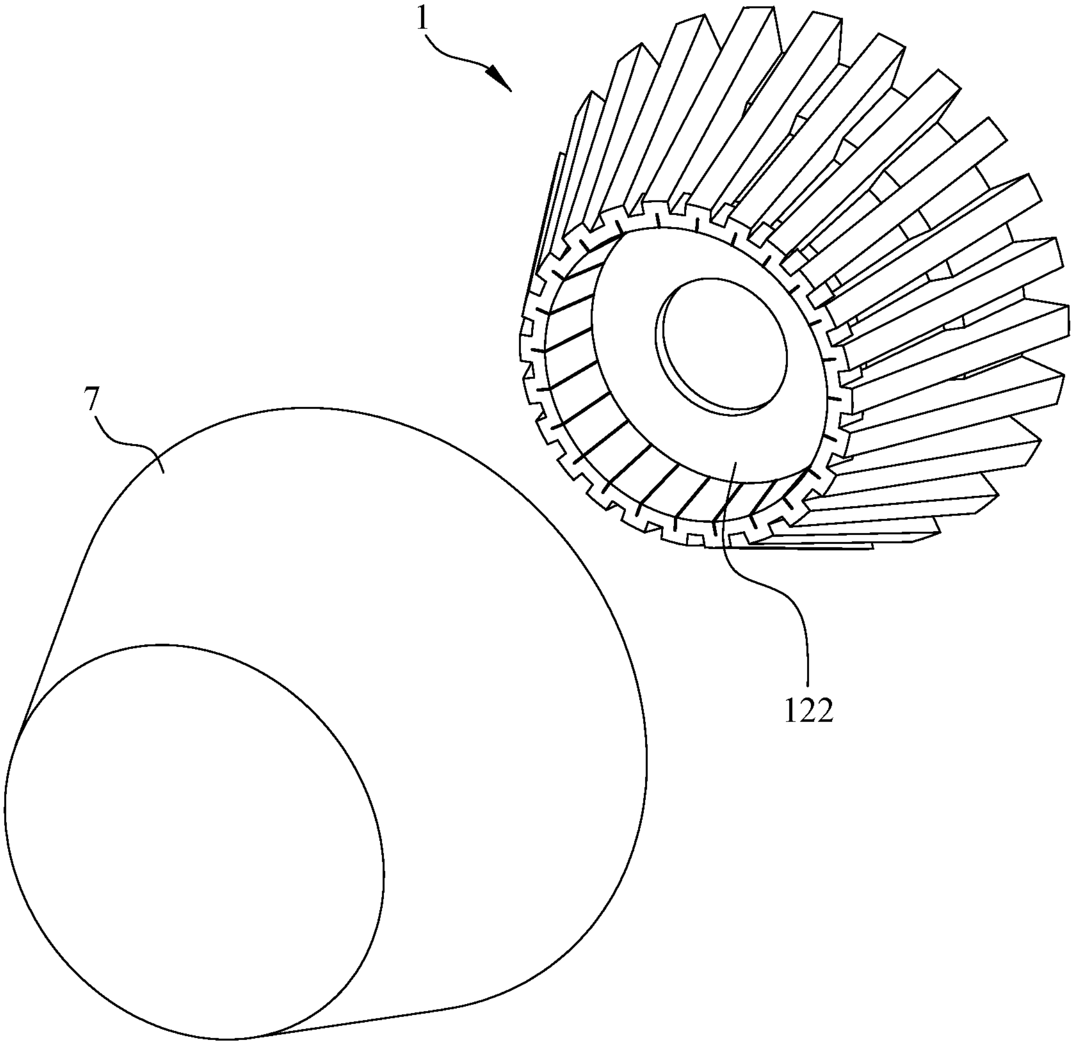
FIG. 10 is a schematic view of Embodiment 5 of the present invention.

Preferably, as shown in FIG. 10, which is Embodiment 5 of the present invention, the LED lamp heat dissipation structure further comprises an outer shell 7, wherein the outer shell 7 sleeves the metal plate 1 from outside in a direction toward the outer surface 122.

Although the present invention has been described with reference to the preferred embodiments, it will be apparent to those skilled in the art that a variety of modifications and changes in form and detail may be made without departing from the scope of the present invention defined by the appended claims.

What is claimed is:

1. An LED lamp heat dissipation structure with outward corrugations and reflector function, comprising:

a metal plate having a first predetermined shape portion, wherein a center of the metal plate is defined to have a second predetermined shape portion, an outer edge of the metal plate is formed to be a tapered portion with a plurality of outward corrugations and with a center at the second predetermined shape portion, the tapered portion has a predetermined inclination angle with respect to the second predetermined shape portion, two surfaces of the second predetermined shape portion are defined as an inner surface and an outer surface, respectively, and the tapered portion has an interior surface and surrounds the inner surface to define an inner space; and an LED lamp substrate, closely attached to the inner surface, wherein when the LED lamp substrate is empowered with electricity, a heat and a light are generated, wherein each outward protrusion of the outward corrugations consists of two sections of the metal plate and the two sections in each outward protrusion form two inner walls, each of the two inner walls has an inner wall surface recessed from the inner space above the inner surface and connected with the interior surface of the tapered portion, the two inner wall surfaces face each other in a longitudinal direction of the tapered portion, most of the heat is conducted to the second predetermined shape portion through the inner surface, and then conducted to an ambient air through the outer surface, the tapered portion, and the outward corrugations, a part of the light directly irradiates outward, and another part of the light is reflected outward through the tapered portion.

2. The LED lamp heat dissipation structure according to claim 1, wherein the second predetermined shape portion is formed to have a convex platform protruded toward the inner space, the outer surface is formed to have a corresponding recess with a flat bottom, the tapered portion are uniformly cut at predetermined places to form a plurality of U-shaped pieces, each of the plurality of U-shaped pieces is located between two adjacent outward corrugations, a bottom of each of the plurality of U-shaped pieces faces toward the second predetermined shape portion, each of the plurality of U-shaped pieces is respectively bent toward the inner space to be connected with the convex platform, and a plurality of heat dissipation holes are respectively formed in original positions of the plurality of U-shaped pieces before being bent.

3. The LED lamp heat dissipation structure according to claim 1, further comprising a lamp holder, wherein the lamp holder has a coupling opening and a coupling portion, and the coupling opening is connected with the tapered portion in a direction toward the outer surface.

4. The LED lamp heat dissipation structure according to claim 1, wherein the tapered portion is provided with a light guide cover at an opening edge thereof so as to make the light more uniform.

5. The LED lamp heat dissipation structure according to claim 1, further comprising an outer shell, wherein the outer shell sleeves the metal plate from outside in a direction toward the outer surface.

6. An LED lamp heat dissipation structure with outward corrugations and reflector function, comprising:

a metal plate having a first predetermined shape portion, wherein a center of the metal plate is defined to have a second predetermined shape portion, an outer edge of the metal plate is formed to be a tapered portion with a plurality of outward corrugations and with a center at the second predetermined shape portion, the tapered portion has a predetermined inclination angle with respect to the second predetermined shape portion, two surfaces of the second predetermined shape portion are defined as an inner surface and an outer surface, respectively, and the tapered portion surrounds the inner surface to define an inner space; and an LED lamp substrate, closely attached to the inner surface, wherein when the LED lamp substrate is empowered with electricity, a heat and a light are generated, wherein most of the heat is conducted to the second predetermined shape portion through the inner surface, and then conducted to an ambient air through the outer surface, the tapered portion, and the outward corrugations, a part of the light directly irradiates outward, and another part of the light is reflected outward through the tapered portion, and wherein the second predetermined shape portion is formed to have a convex platform protruded toward the inner space, the outer surface is formed to have a corresponding recess with a flat bottom, the tapered portion are uniformly cut at predetermined places to form a plurality of U-shaped pieces, each of the plurality of U-shaped pieces is located between two adjacent outward corrugations, a bottom of each of the plurality of U-shaped pieces faces toward the second predetermined shape portion, each of the plurality of U-shaped pieces is respectively bent toward the inner space to be connected with the convex platform, and a plurality of heat dissipation holes are respectively formed in original positions of the plurality of U-shaped pieces before being bent.

7. The LED lamp heat dissipation structure according to claim 6, further comprising a lamp holder, wherein the lamp holder has a coupling opening and a coupling portion, and the coupling opening is connected with the tapered portion in a direction toward the outer surface.

8. The LED lamp heat dissipation structure according to claim 6, wherein the tapered portion is provided with a light guide cover at an opening edge thereof so as to make the light more uniform.

9. The LED lamp heat dissipation structure according to claim 6, further comprising an outer shell, wherein the outer shell sleeves the metal plate from outside in a direction toward the outer surface.

* * * * *